United States Patent
Audell

(10) Patent No.: US 10,707,661 B2
(45) Date of Patent: Jul. 7, 2020

(54) FOLDABLE DISPOSABLE PROTECTIVE GANG BOX COVER

(71) Applicant: Harry Audell, Park City, UT (US)

(72) Inventor: Harry Audell, Park City, UT (US)

(*) Notice: Subject to any disclaimer, the term of this patent is extended or adjusted under 35 U.S.C. 154(b) by 142 days.

(21) Appl. No.: 16/149,013

(22) Filed: Oct. 1, 2018

(65) Prior Publication Data

US 2020/0106249 A1    Apr. 2, 2020

(51) Int. Cl.
  *H02G 3/08*    (2006.01)

(52) U.S. Cl.
  CPC .................. *H02G 3/081* (2013.01)

(58) Field of Classification Search
  CPC .......... H02G 3/08; H02G 3/081; H02G 3/083; H02G 3/14; H02G 3/28; H02G 3/286; H02G 3/288
  USPC ...... 174/50, 53, 57, 58, 61, 63, 66, 67, 480, 174/481; 220/3.2, 3.3, 3.4, 3.5, 3.6, 3.7, 220/3.8, 3.9, 3.92, 3.94; D13/156
  See application file for complete search history.

(56) References Cited

U.S. PATENT DOCUMENTS

| | | | | |
|---|---|---|---|---|
| 1,956,196 A * | 4/1934 | Korab | ...................... | H02G 3/14 220/3.4 |
| 2,815,144 A * | 12/1957 | Kullander | .............. | H02G 3/125 220/3.4 |
| 3,059,803 A * | 10/1962 | Holsinger | ................ | H02G 3/14 220/3.4 |
| 3,061,083 A * | 10/1962 | Hubbell, Jr. | ............. | H02G 3/14 206/216 |
| 3,601,276 A * | 8/1971 | Culpepper | ............... | H02G 3/14 220/3.4 |
| 4,057,657 A * | 11/1977 | Garnett | ..................... | C08F 2/48 427/567 |
| 4,953,733 A * | 9/1990 | Loscuito | .................. | H02G 1/00 220/3.4 |
| 5,301,800 A * | 4/1994 | Kenney | ................... | A47F 7/147 206/449 |
| 6,103,974 A * | 8/2000 | Erdfarb | .................. | B05B 12/20 174/66 |
| 6,664,471 B1 * | 12/2003 | Howe, Jr. | ................ | H02G 3/14 174/66 |
| 6,686,540 B2 * | 2/2004 | Compagnone, Jr. | ..... | H02G 3/12 174/58 |
| D502,926 S * | 3/2005 | Zimmerman | ................ | D13/152 |
| 7,102,079 B1 * | 9/2006 | Kurtin | ..................... | H02G 3/00 174/135 |

(Continued)

*Primary Examiner* — Joshua E Rodden
(74) *Attorney, Agent, or Firm* — Steven Rinehart

(57) ABSTRACT

A disposable protective cover for gang boxes prevents paint, drywall and building material from entering the gang boxes during finishing operations, improves the stability of mounted switches and outlets, and provides aesthetically pleasing drywall to gang box edges. The cover is foldable from a stamped planar sheet of various materials and includes upwardly-protruding tabs. The cover is universally dimensioned to cover conventionally-sized openings of single, double, triple and quadruple gang boxes forming an interior friction fit therewith. The cover is easily removed by use of a utility knife to break the barrier of the drywall mud against the cover. Once removed the gang box interior edges can be easily shaved and sanded clean of excess drywall mud, to reveal a perfect completed wall mounted gang box, ready for the installation of switches and outlets when convenient.

12 Claims, 4 Drawing Sheets

(56) References Cited

U.S. PATENT DOCUMENTS

| | | | | |
|---|---|---|---|---|
| 7,390,965 | B2 * | 6/2008 | Hartwig | H02G 3/14 174/66 |
| 7,456,359 | B1 * | 11/2008 | Tidd | H02G 3/14 174/66 |
| 7,608,781 | B2 * | 10/2009 | Compagnone, Jr. | H02G 3/12 174/58 |
| 7,935,887 | B2 * | 5/2011 | Petak | H02G 1/00 174/66 |
| 8,835,763 | B1 * | 9/2014 | Hammond | H02G 3/12 174/66 |
| D736,066 | S * | 8/2015 | Hull | D8/354 |
| 9,960,582 | B2 * | 5/2018 | Crawford, Jr. | H02G 3/12 |
| 2003/0102308 | A1 * | 6/2003 | Sullivan | H01R 13/447 220/3.2 |
| 2003/0141092 | A1 * | 7/2003 | Petak | H02G 3/12 174/66 |
| 2006/0021780 | A1 * | 2/2006 | Hill | H02G 3/14 174/67 |
| 2007/0023427 | A1 * | 2/2007 | Brennan | H02G 3/12 220/3.8 |
| 2007/0194205 | A1 * | 8/2007 | Blackmon | E04G 15/063 249/185 |
| 2008/0236860 | A1 * | 10/2008 | Howe | H02G 3/14 174/67 |

\* cited by examiner

FOLDABLE DISPOSABLE PROTECTIVE GANG BOX COVER

FIELD OF THE INVENTION

This invention relates to electrical gang boxes, and more particularly relates to temporary covers used to protect gang wiring during drywall installation and painting, and improves stability and operability of mounted switches and outlets, and the ability to keep the same clean of deleterious materials in residential and commercial construction.

BACKGROUND

Description of the Related Art

Drywalling the interior of a house, whether new or remodel construction, is not a clean, precise or accurate operation. Drywall is always crudely cut around gang boxes during construction and gang boxes are always filled with drywall mud and other deleterious materials during drywall finishing. This condition typically goes uncorrected when switches and outlets are installed and interferes with their proper operation. Electrical components installed in poorly fitted and finished gang boxes have led to hazardous conditions (i.e. fire) that may jeopardize the health, welfare and safety of the general public. There is no municipal regulation that governs the fit and finish of gang boxes. This invention, the foldable, disposable, protective gang box cover, corrects that situation.

Gang boxes contain and provide access to the wiring for switches and outlets within the electrical receptacle. Although gang box covers exist in the art which are useful to cover gang box openings during painting, drywalling and finishing, covers known in the art do not successfully, cost-effectively, or optimally protect the gang box wiring or improve switch and outlet stability. The covers known in the art are cumbersome, are not disposable, involve spring-biased components, and are expensive to stock and manufacture, particularly when average residences incorporate 100 or more gang boxes around which drywall and paint are formed and disposed during installation.

Gang boxes are rectangular in shape and require complementary-shaped rectangular covers which typically position over paint and drywall to protect interiorly-housed electrical components. Gang boxes include single gang, double gang, triple gang and quadruple gang types. Electricians install gang boxes to receive electrical outlets and/or light switches that power fixtures.

Finishing work is typically performed after electrical wiring installation by drywallers, painters, carpenters, and other finishers. Drywall is installed over gang boxes by cutting away a section of the wall material corresponding to the perimeter of the box, usually by hand using a razor blade or by electric cutting tool, without jigs or templates. It is almost impossible to accurately measure by eye and cut four lines on the drywall surface which perfectly contour the gang box perimeter. The cutting process itself is inaccurate. Additional cutting is often necessary. Sections of the drywall are often overcut leaving an unattractive gap in the wall surface usually hidden from homeowners with screwed-down covers until repainting is required.

There are currently no standardized protocols in the industry for protecting gang box during finishing or for provided clean wall abutments thereto. The lack of implements and standard protocols increases the likelihood that materials such as paint, plaster, mud, and joint compound will enter and contaminate the boxes, creating dangerous potential for electrical short-circuit and fires as well as appearing aesthetically unpleasing. In commercial and residential construction applications, there is a need to provide a product that enhances the quality of construction in this area.

The inconvenience or the difficulty encountered by craftsmen and finishers could be substantially alleviated if a device which overcomes these shortcomings were available. There is a substantial need for a means of curing these deficiencies in the art.

Use of this foldable, disposable protective gang box cover facilitates several primary functions. These are: (1) to protect the wiring inside the gang box from drywall mud product and paint, (2) provides a clean interior environment for wiring and electrical components such as switches and outlets, (3) improves stability of mounted switches and outlets, (4) creates an architecturally pleasing condition that represents state-of-the-art construction practices, and (5) could reduce fire hazards related to defective drywall construction.

SUMMARY

From the foregoing discussion, it should be apparent that a need exists for a disposable protective gang box cover. Beneficially, such a device would overcome inefficiencies with the prior art by providing an inexpensive, efficient means of protecting open gang boxes during construction and facilitating clean gang box interiors and drywall abutment of the gang box for the betterment of mounting switches and outlets.

The present invention has been developed in response to the present state of the art, and in particular, in response to the problems and needs in the art that have not yet been fully solved by currently available apparti. Accordingly, the present invention has been developed to provide a foldable, disposable protective gang box cover, the gang box cover comprising: a rectangular base plate dimensioned to align with a periphery of a standardized gang box, the rectangular base plate having a planar upper surface and a planar lower surface; four or more planar sidewalls, each sidewall affixed to the baseplate, wherein the sidewalls are adapted to fold downwardly to form a housing having a planar top face; and two or more tabs formed from cutting the cover in an unfolded configuration such that the tabs jut upwardly from the top face when the cover is in a folded configuration; wherein the housing positions over a gang box and forms a friction fit therewith.

The standardized gang box may comprise one of a single gang box, a dual gang box, a triple gang box and a quadruple gang box. Two or more of the sidewalls may define a recess on an outer edge for forming subtabs adapted to bend inwardly to improve the friction fit.

The cover may further comprise one of cardboard, polymeric materials, and organic materials.

The sidewalls may be coated with one of an impermeable laminate, and a polymeric and cellophane film. The cover may alternatively be waxed.

In various embodiments, one of a polyurethane spray and an acrylic spray may be applied to the cover.

The cover may be alternatively perforated to facilitate folding of the sidewalls. The cover may be formed as a single integrated piece.

A second foldable, disposable protective gang box cover is also provided, the gang box cover comprising: a perforated, rectangular base plate dimensioned to align with a periphery of a standardized gang box, the rectangular base plate having a planar upper surface and a planar lower surface; four or more planar sidewalls, each sidewall affixed to the baseplate, wherein the sidewalls are adapted to fold to form a housing having a planar top face; and two or more tabs formed from cutting the cover in an unfolded configuration such that the tabs jut upwardly from the top face when the cover is in a folded configuration; wherein the housing positions over a gang box and forms a friction fit therewith.

The gang box cover may comprise one to be used with a single gang box, a dual gang box, a triple gang box and a quadruple gang box.

Two or more of the sidewalls may define a recess on an outer edge for forming subtabs adapted to bend inwardly to improve the friction fit.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
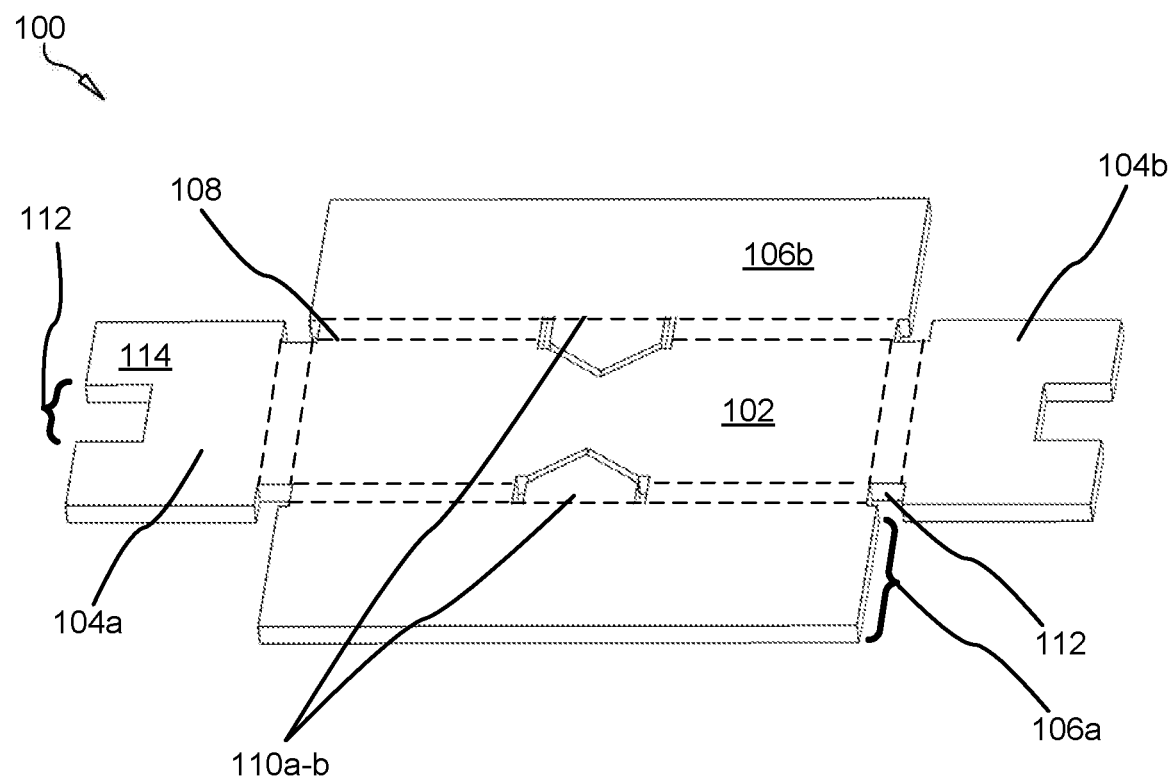
FIG. 1 is an upper perspective view of a foldable, disposable protective single gang box cover in an unfolded configuration in accordance with the present invention.

FIG. 1 is an upper perspective view of a foldable, disposable protective single gang box cover 100 in an unfolded configuration in accordance with the present invention.

The cover 100 may be formed from cardboard, metallic, polymeric materials, or organic materials (e.g., wood, paper or leather). Typically, the cover 100 is formed from a single integrated piece cut, stamped or molded from a sheet of cardboard or elastomeric/polymeric material. The cover may be corrugated and may alternatively be formed from sheet metal.

The cover 100 includes a rectangular baseplate 102 which is dimensioned to align with, and cover, a gang box opening of standardized shape and size. The gang box may be a single, dual, triple or quadruple type gang box in various embodiments, or any other standardized electrical box.

A plurality of sidewalls 104, 106 jut laterally from the baseplate 102. These sidewalls are folded downward to form a housing for insertion into the interior of an open gang box and protecting the same from contamination with mud, paint, plaster and other building materials during finishing. The folded cover 100 engages the gang box and forms a friction fit therewith.

The cover 102 may define perforations 108 for facilitating in folding. Additionally, tabs 110 may be cut, defined or formed from the folded cover 100. The tabs 110 are useful for withdrawing the cover 100 from the gang box after finishing operations.

A plurality of recesses 112 may form or be defined around the edges of the sidewalls 104, 106. These recesses 112 break the exterior edges of the sidewalls 104, 106 into downwardly protruding subtabs 114 which may themselves be folded inwardly to increase the friction fit of the cover 100 with the gang box in a folded configuration.

Figure 2:
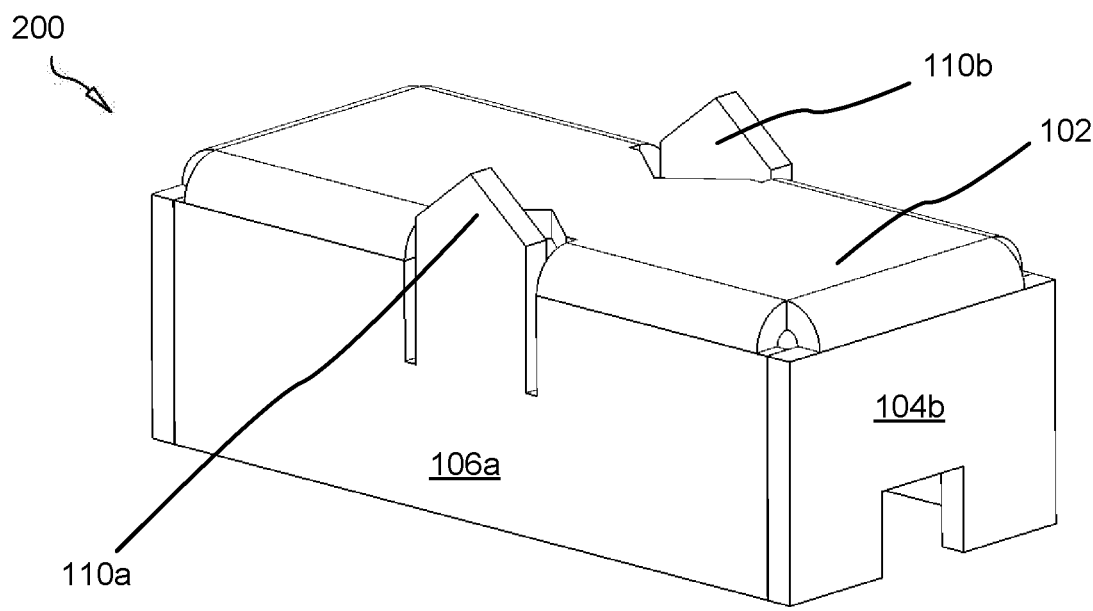
FIG. 2 is a side elevational perspective view of a foldable, disposable protective single gang box cover in a folded configuration in accordance with the present invention.

FIG. 2 is a side elevational perspective view of a foldable, disposable protective single gang box cover 200 in a folded configuration in accordance with the present invention.

The cover 200 aligns with the perimeter of a gang box mounted to a wall structure and inserts within the gang box perimeter, forming a friction fit with the gang box. The sidewalls envelope or substantially envelope the interior periphery of the exposed gang box, whether a single, dual, triple or quadruple gang box cover, varying in height and width from 2 inches to 12 inches. Typical embodiments of the cover 200 are universally dimensioned to dispose over standard gang boxes.

The cover 200 protrudes outwardly from the gang box allowing drywall mud to be inserted into the annulus between the drywall and cover 200 as a filler.

As shown, the tabs 110a-b, which are tapered or triangular in the shown embodiment, rise upwardly from the top planar surface of the baseplate 102. In various embodiments, the tabs 110 may be affixed to the cover 200 using means known to those of skill in the art, including through use of adhesives/glues, tape, screws, and the like.

Figure 3:
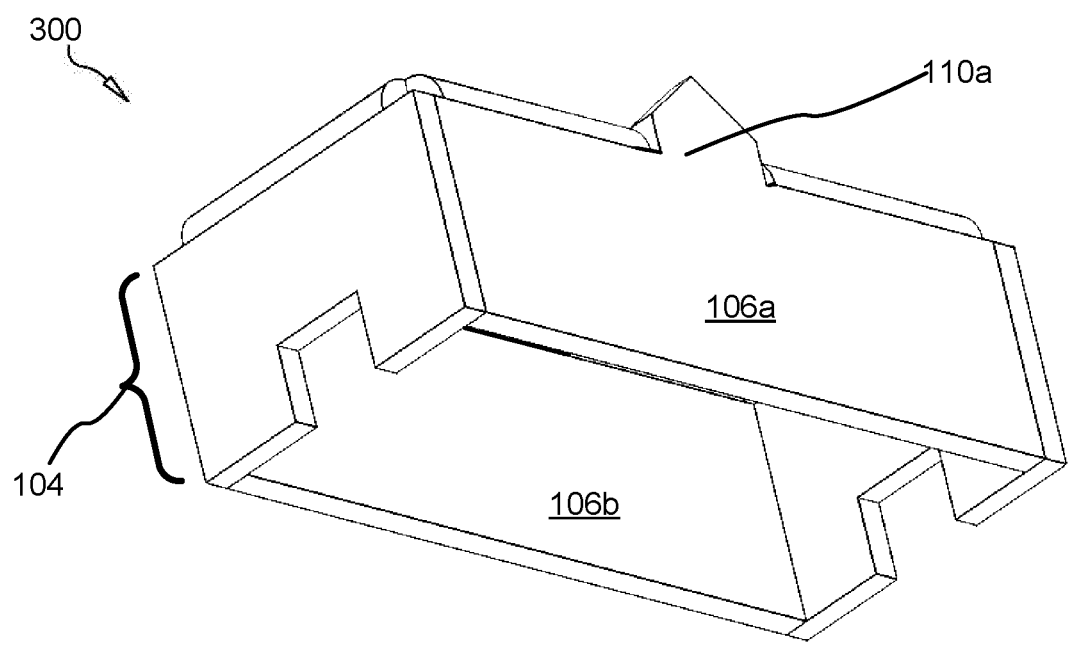
FIG. 3 is a lower side elevational perspective view of a foldable, disposable protective single gang box cover in a folded configuration in accordance with the present invention.

FIG. 3 is a lower side elevational perspective view of a foldable, disposable protective single gang box cover 300 in a folded configuration in accordance with the present invention.

The cover 300 may be wrapped in cellophane or otherwise treated to be water and/or oil resistant. In various embodiments, the cover 300 is coated with an impermeable membrane to resist absorption of paint, mud and adhesives. A film or laminate, in some cases polymeric tape, may be adhered to one or more exterior or interior surfaces of the sidewalls 104, 106 and/or cover 102. The cover 300 may be sprayed with an acrylic or polyurethane spray. In still other embodiments, the cover 300 is waxed.

Figure 4:
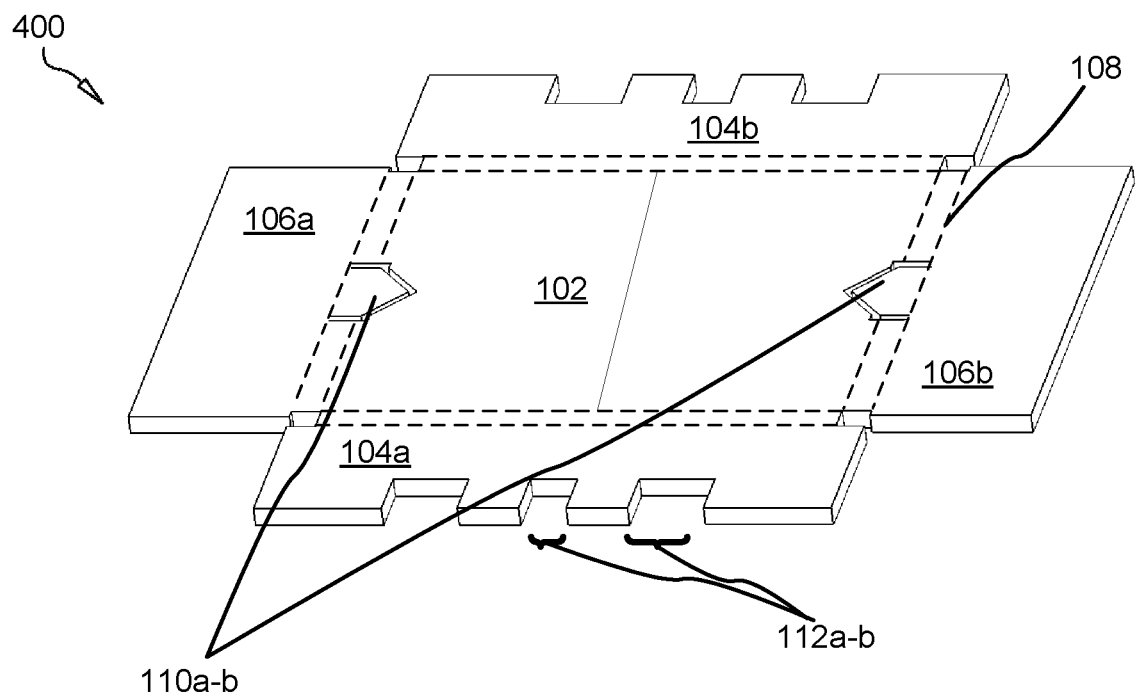
FIG. 4 is a side perspective view of a foldable, disposable protective dual gang box cover in an unfolded configuration in accordance with the present invention.

FIG. 4 is a side perspective view of a foldable, disposable protective dual gang box cover 400 in an unfolded configuration in accordance with the present invention.

As shown, a plurality of recesses 112a-b may be defined by the lower edge of the sidewall 104a. The tabs 110a-b may be cut into one or more of the sidewalls 104 and/or sidewalls 106 and the baseplate 102.

Figure 5:
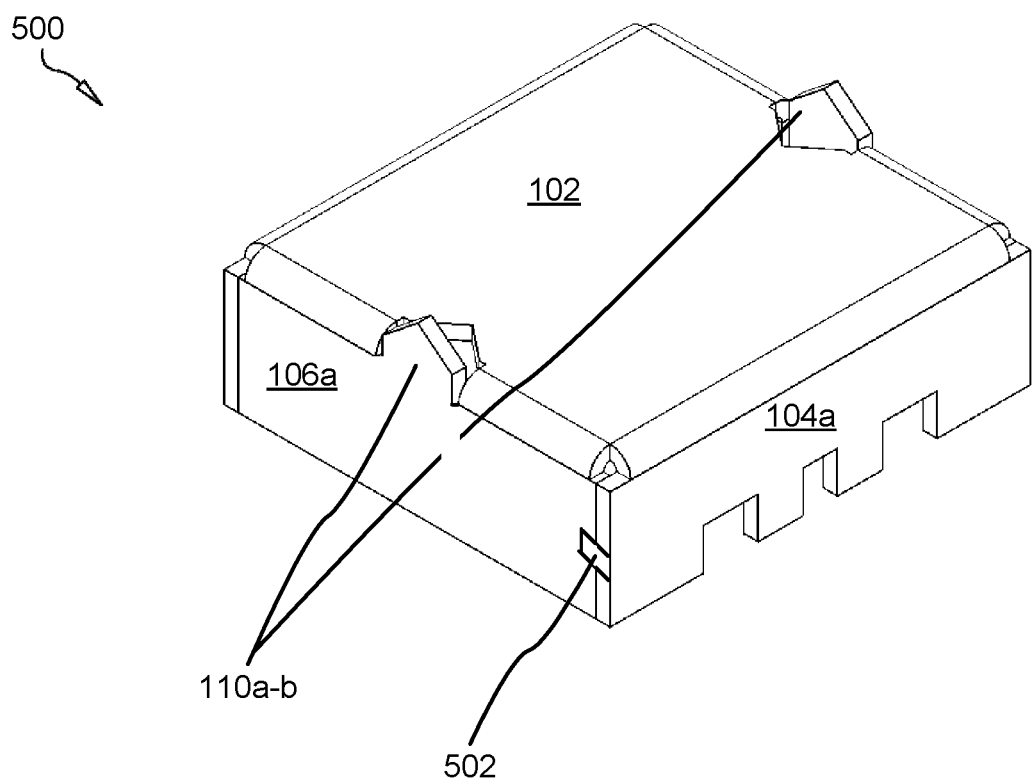
FIG. 5 is a side perspective view of a foldable, disposable protective dual gang box cover in a folded configuration in accordance with the present invention.

FIG. 5 is a side perspective view of a foldable, disposable protective dual gang box cover 500 in a folded configuration in accordance with the present invention.

Tape 502 or other affixation means may be used to affix a sidewall 106 to a sidewall 104 as shown after the housing is formed from the folded sidewalls.

Figure 6:
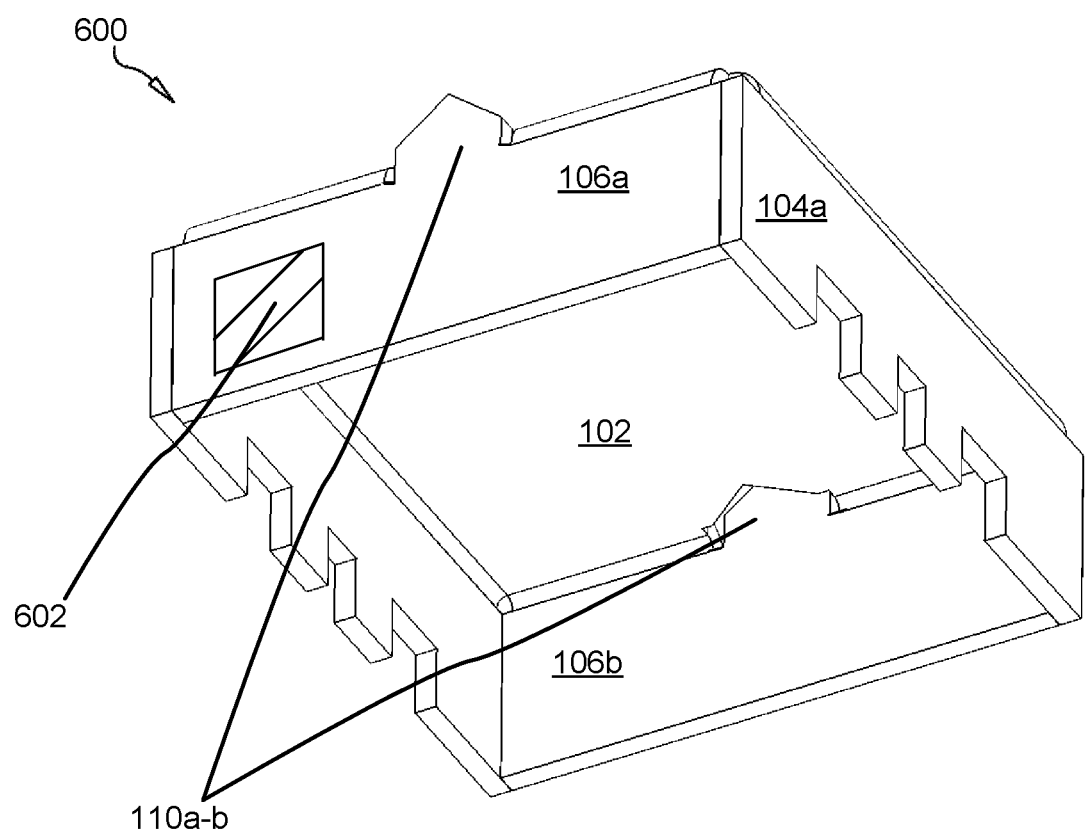
FIG. 6 is a lower side perspective view of a foldable, disposable protective dual gang box cover in a folded configuration in accordance with the present invention.

FIG. 6 is a lower side perspective view of a foldable, disposable protective dual gang box cover 600 in a folded configuration in accordance with the present invention.

A polymeric tape 602 is applied to the sidewall 106a as shown. Tape may be also applied to sidewall 104, or to all four sidewalls of covers 100 or 200.

The cover 100 is easily removed by use of a utility knife to break the barrier of the drywall mud against the cover's sidewalls 104 and 106.

Once the cover 100 is removed the gang box interior edges can be easily shaved and sanded clean of excess drywall mud, to reveal a perfect completed wall mounted gang box, ready for the installation of switches and outlets.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A foldable, disposable protective gang box cover, the gang box cover comprising:
   a perforated rectangular base plate dimensioned to align with a perimeter of a gang box, the rectangular base plate having a planar upper surface and a planar lower surface;
   four or more planar sidewalls, each sidewall affixed to the baseplate, wherein the sidewalls are adapted to fold downwardly to form a housing; and
   two or more tabs formed from cutting the cover in an unfolded configuration such that the tabs jut upwardly from the top face when the cover is in a folded configuration;
   wherein the cover is perforated across each junction point between the sidewalls and baseplate to facilitate folding of the sidewalls; and one or more of the sidewalls are again cut across a top surface away from the baseplate in an unfolded configuration to form the tabs;
   wherein the housing positions over the gang box and forms a friction fit therewith.

2. The cover of claim 1, wherein the gang box comprises one of a single gang box, a dual gang box, a triple gang box and a quadruple gang box.

3. The cover of claim 1, wherein the sidewalls define a plurality of recesses on a lower edge forming subtabs adapted to bend inwardly to improve the friction fit.

4. The cover of claim 1, wherein the cover comprises one of cardboard, polymeric materials, and organic materials.

5. The cover of claim 1, wherein the sidewalls are coated with one of an impermeable laminate and a polymeric film.

6. The cover of claim 1, wherein the cover is waxed.

7. The cover of claim 1, wherein one of a polyurethane spray and an acrylic spray is applied to the cover.

8. The cover of claim 1, wherein the cover is formed as a single integrated piece.

9. The cover of claim 1, wherein the cover is adapted to be easily removed by use of a utility knife to break a barrier of the drywall mud against the sidewalls.

10. The cover of claim 1, wherein the cover is adapted to facilitate ready shaving and sanding clean of excess drywall mud around the gang box.

11. A foldable, disposable protective gang box cover, the gang box cover comprising:
   a rectangular base plate dimensioned to align with a perimeter of a gang box, the rectangular base plate having a planar upper surface and a planar lower surface;
   four planar sidewalls, each sidewall affixed to the baseplate, wherein the sidewalls are adapted to fold downwardly to form a housing; and
   two tabs formed from cutting the baseplate and a respective one of the sidewalls in an unfolded configuration such that the tabs jut upwardly from the top face when the cover is in a folded configuration;
   wherein the housing positions within a gang box and forms a friction fit therewith;
   wherein the cover is perforated across each junction point between the sidewalls and baseplate to facilitate folding of the sidewalls; and one or more of the sidewalls are again cut across a top surface away from the baseplate in an unfolded configuration to form the tabs;
   wherein the sidewalls define a plurality of recesses on a lower edge forming subtabs adapted to bend inwardly to improve the friction fit.

12. The cover of claim 1, wherein the tabs are triangular.

* * * * *